March 9, 1937.　　　G. C. BATZ ET AL　　　2,073,533
SPRING ASSEMBLY
Filed June 17, 1935　　　2 Sheets-Sheet 1
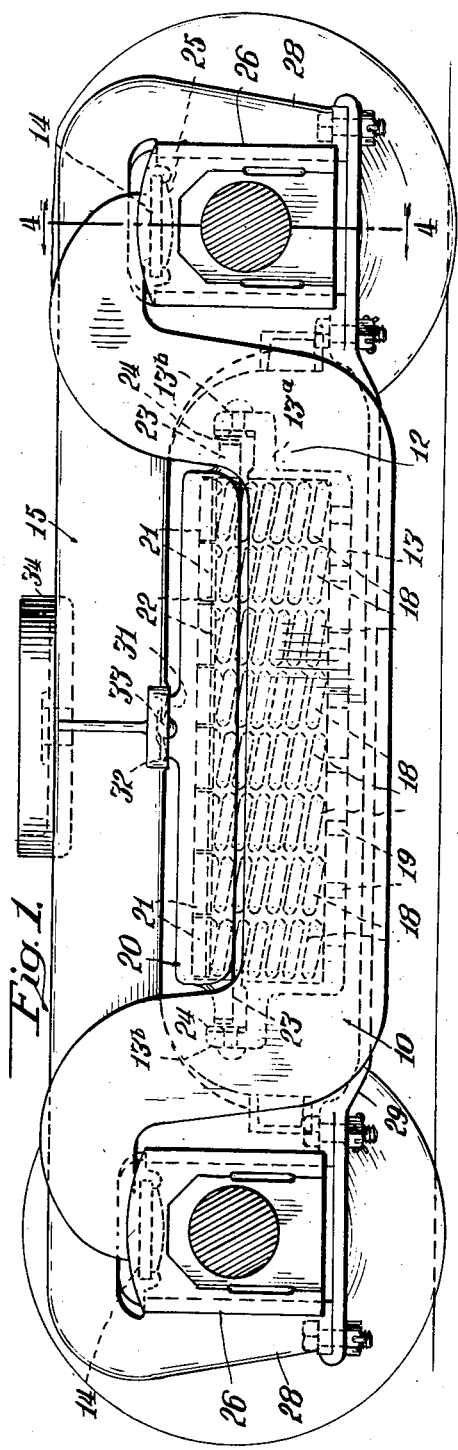
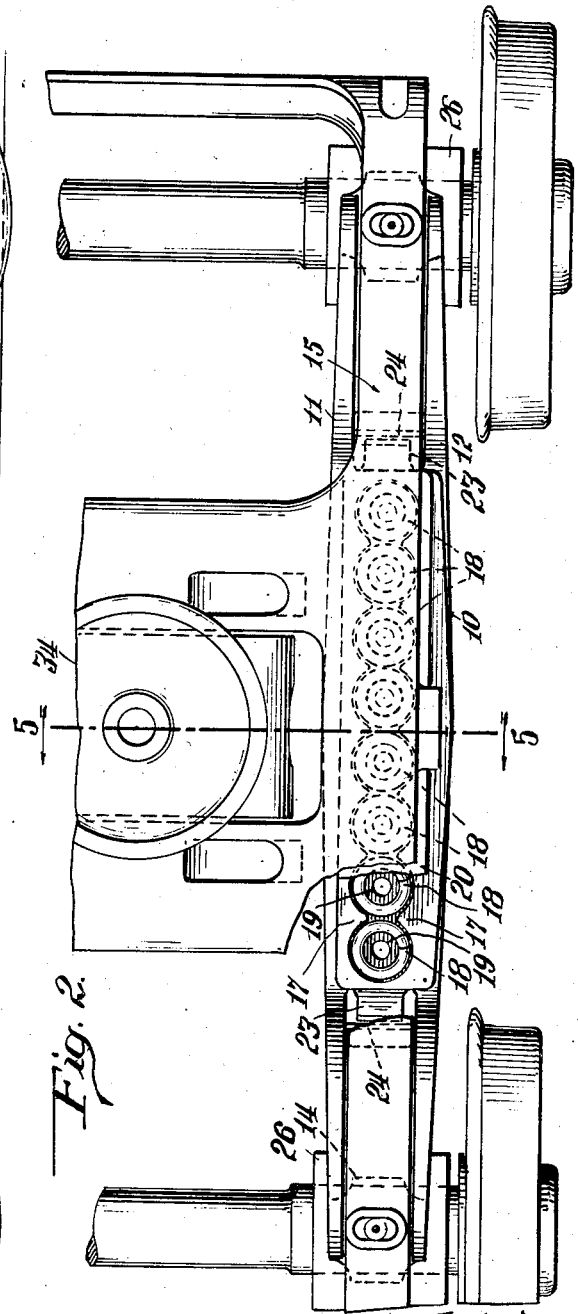
Inventors
George C. Batz and
Howard H. Luening,
By George Heidmann
Attorney.

March 9, 1937. G. C. BATZ ET AL 2,073,533
SPRING ASSEMBLY
Filed June 17, 1935 2 Sheets-Sheet 2
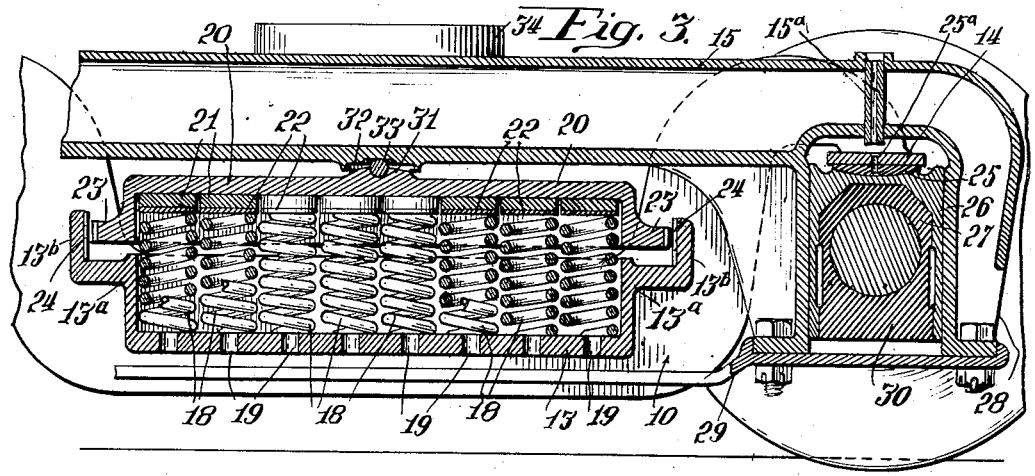
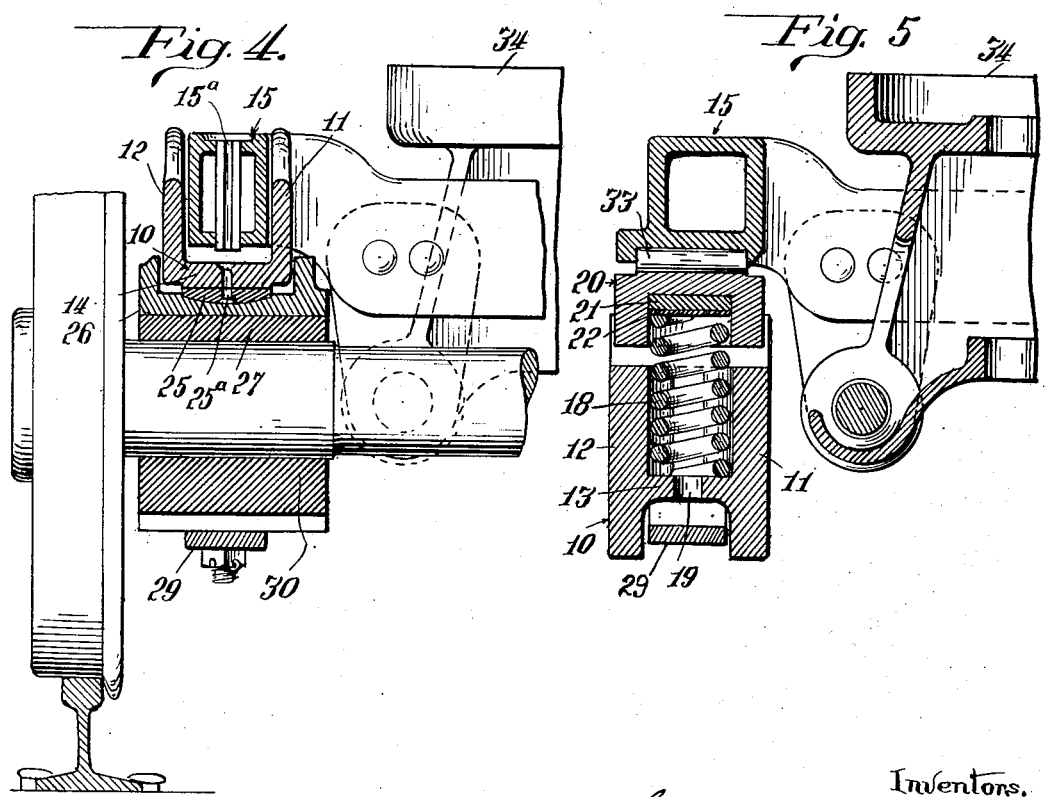
Inventors.
George C. Batz
Howard H. Lanning
By George Heideman
Attorney Patented Mar. 9, 1937

2,073,533

UNITED STATES PATENT OFFICE 2,073,533

SPRING ASSEMBLY

George C. Batz and Howard H. Lanning, Topeka, Kans.

Application June 17, 1935, Serial No. 27,035

8 Claims. (Cl. 105—194)

Our invention relates to an improved spring assembly more especially adapted for the trucks of locomotives and railway vehicles; the invention involving certain improved features in the design of the trucks whereby ample and durable means are provided for accurately distributing to each axle bearing of the truck the proportion of the truck-borne load that the bearing should carry as contemplated by the particular truck design.

Another object of the invention is to combine in a single piece all of the elements that are required to transmit the load from the springs of the truck to the journal boxes through the medium of what might be called a floating convexed element disposed intermediate of the ends of the equalizer and the bearing boxes.

One object of the invention is to simplify the construction of the load transmitting element so as to eliminate wear and thus greatly reduce maintenance; a uniform loading of the journal bearing surfaces being accomplished by means whereby the load applied to the journal box will be centered at the vertical center line of the bearing irrespective of the varying positions which the bearing assumes when the wheels pass over irregularities in the track.

Another object of the invention is the provision of a construction which may be readily made and assembled and at the same time permit repair to be easily made; the advantages of our invention will be readily comprehended from the detailed description of the accompanying drawings, wherein:

Figure 1 is a side elevation of a truck provided with our improved spring assembly.

Figure 2 is a top plan view of a portion of the truck and our improved spring assembly, with a portion broken away and shown in section.

Figure 3 is a longitudinal sectional view of one side of the truck with our spring assembly.

Figure 4 is a vertical sectional view taken substantially on the line 4—4 of Figure 1.

Figure 5 is a vertical sectional view taken substantially on the line 5—5 of Figure 2.

The invention relates to certain features in the design of a truck for locomotives and railway vehicles and in the specific exemplification disclosed in the drawings the invention is arranged as applied to a four-wheel truck of what is termed as the inboard bearing type, although it will be understood that, with suitable modifications, the invention is also applicable to other types of trucks.

The particular embodiment involves an equalizer member 10 disposed lengthwise of the truck side frame from journal box to journal box as shown in Figure 1. The equalizer member 10 is preferably a one piece steel casting substantially of channel formation throughout, with slight variations, so as to provide the spaced apart substantially parallel side wall portions 11 and 12, united throughout a major portion of the length of the equalizer by the transverse wall portion 13 arranged intermediate of the top and bottom edges of the side wall portions 11 and 12, see Figure 5; while the side walls at the ends of the equalizer are united by the tie portions 14, see Figure 4.

The equalizer 10, adjacent the ends, is curved or disposed upwardly with the side walls 11 and 12 at these points left unconnected so as to permit the equalizer to straddle the truck frame 15, as shown in Figures 1 and 3.

The transverse wall portion or web 13, adjacent to the upwardly curved ends of the equalizer, terminates in the upwardly disposed and angularly formed web portions 13a with the result that a box-like pocket is provided in the equalizer, as clearly shown in Figure 3. The bottom of this pocket, at prearranged points, is provided with arcuate upstanding webs as at 17, see Figure 2, at corresponding points along both side walls of the pocket, so as to provide a plurality of annular seats to receive the ends of coil springs 18. A suitable number of springs 18 are employed and arranged in sufficiently spaced relation to enable free movement of the coils; the assembly being shown with single helical springs, although concentrically arranged helical springs if required may be employed to provide the necessary load carrying capacity. The bottom wall 13, coincident with each spring pocket, is preferably provided with the cored holes 19, see Figures 3 and 5.

The upper ends of the springs 18 extend into a channel shaped spring seat or upper member 20 which is formed with similar spring seats in substantial vertical alignment with those in the equalizer 10. This upper member 20 is of length slightly less than the distance between the angularly disposed web portions 13a adjacent opposite ends of the main horizontal portion of the equalizer in order that the member 20 may fit between the side walls of the equalizer and between the upstanding portions 13b, see Figure 3. The member 20 is normally entirely supported by the springs.

The spring seats in the top member 20 are each preferably provided with a pad 21, of resilient material such as rubber or wood, in order to absorb short vibrations of high frequency that may be set up and which have been found to be particularly destructive to steel springs.

In order to prevent the ends of the springs becoming embedded in the relatively soft resilient pads, metal plates or discs 22 are interposed between the ends of the helical springs 18 and the resilient pads 21, as such embedment would destroy the effect of the pads.

The ends of the top spring seat member 20, adjacent the lower side, are provided with the projections 23 which freely fit between the side walls 11 and 12 of the equalizer and within the confines of the upwardly disposed portions 13ᵇ, as shown in Figure 3; the movement of the top member 20 thus being guided in its relation to the equalizer; suitable clearance between the equalizer walls and the top member being, of course, provided.

In order to minimize wear, the surfaces of possible rubbing contact between projections 23 and the web portions 13ᵇ of the equalizer, are preferably provided with wear plates or surfaces of hard material as shown at 24, see Figure 3, which may be riveted or otherwise immovably secured in place.

The relation between the depth of the pocket in the equalizer, the depth of the pocket in the top member 20 and the length of the springs is such that the vertical clearance between the sides of the upper member and of the equalizer, under normal conditions, is slightly less than the sum of the spaces between the coils of the helical springs, so that a solid contact between upper spring seat member 20 and the equalizer 10 will be provided in the event of an unusually severe overload, with the result that the coils of the helical springs will be protected against being forced solidly together.

The tie portions 14 at the ends of the equalizer 20 are preferably flat as shown in Figure 4 and rest on the flat upper sides of the convexed discs 25 which rest in concaved surfaces formed on the upper sides of the journal boxes 26, which are provided with the usual journal box bearings as at 27; while the journal boxes are slidably mounted between the pedestal jaws 28 of the truck frame 15.

The convexed discs 25 are preferably of bronze or other antifriction metal and circular; the lower surfaces being convexed to conform to the shape of the depressions or seats formed in the tops of the journal boxes. The transverse or connecting web 14 and the disc 25 are preferably provided with registering oil holes as at 25ᵃ, see Figure 4, which permit introduction of lubricant to the depressions in the top walls of the journal boxes. To enable introduction of lubricant to the holes 25ᵃ the portions of the truck frame fitting between the side walls of the equalizer are provided with lubricant introducing openings as at 15ᵃ, see Figure 4.

The side wall portions 11 and 12 of the equalizer preferably extend beneath the transverse wall portion or web 13 throughout the lower portion of the equalizer and thus provide an open ended channel for passage therethrough of the tie bar 29, which is bolted across the lower ends of the pedestal jaws 28 to strengthen the pedestal structure and to retain the journal boxes together with the lubricating cellars 30 within the pedestal jaws when the assembled truck is lifted from the rails.

The top member or upper spring seat 20, at a predetermined point intermediate of its ends and suitably located relative to the supporting springs 18, is provided with an upwardly disposed projection 31 arranged transversely of the member 20. This projection 31 is shown extending into a socket 32 in the lower face of the truck frame; the projection 31 and the socket 32 having matching grooves to receive the cylindrical fulcrum 33, which may be welded in the groove of the truck frame 15; the weight being properly divided between the springs.

The body of the locomotive or vehicle carried on the truck is to be equipped with a suitable male center plate, not shown, which is adapted to fit into the female or truck center plate 34; the weight of the vehicle body or locomotive being normally entirely supported by this center plate 34. These center plates are provided with broad contact faces which serve to hold the truck center plate and truck frame in parallel relation to the body center plate and to the body or underframe of the locomotive or vehicle, thus maintaining the truck frame in a substantially horizontal position with reference to the track.

As the weight of the truck frame and its load rest entirely on the pivot or fulcrum 33, the composite structure consisting of upper spring seat 20, springs 18 and equalizer member 10, forms a lever or equalizer that is free to oscillate vertically about the pivot 33 as a center. This permits the ends of the equalizer to rise and fall freely with the upward and downward movements of the journal-boxes as produced by the wheels and axles in passing over humps and depressions in the track.

The specific embodiment of the invention contemplates an equal distribution of load among all wheels, but it will be understood that any predetermined unequal distribution of load between front and back wheels of the truck can be obtained by a relocation of pivot or fulcrum point 33 so as to provide the desired unequal length of equalizer arms.

The invention has been described in terms employed for purposes of description and not as terms of limitation as modifications may be made without, however, departing from the spirit of our invention as expressed in the appended claims.

What we claim is:

1. A spring assembly comprising, in combination with a truck frame and the journal-boxes, a bottom member of substantially channel formation in cross-section throughout its horizontal portion and having upwardly disposed and downwardly curved ends adapted to straddle the truck frame and have bearing on top of the journal boxes; coil springs seated in the channel portion of said member and normally adapted to extend above the sides of the channel portion of said member; an elongated top member of substantially channel form in cross-section and coextensive with the channel portion of the bottom member and adapted to rest on the upper ends of the springs; means intermediate of the two members whereby longitudinal movement of the top member relative to the bottom member is prevented; and fulcrum means intermediate the top member and the truck frame whereby vertical tilting movement of said members relative to the truck frame is permitted.

2. A spring assembly comprising, in combination with a truck frame and the journal boxes slidingly mounted therein, an equalizing member provided intermediate of its ends with a plurality of spring receiving pockets while the ends extend upwardly and thence laterally and downwardly over the top of the journal boxes, the member at the ends of the pockets and intermediate of the side walls of the member having transversely extending walls; a plurality of coil springs seated in said pockets and normally extending above the top of the side walls of the intermediate portion of the member; a top member provided with a plurality of spring seats adapted to receive the upper ends of said springs, said top member at its ends having extensions adapted to fit between the side walls and said transversely extending walls of the equalizer member; and fulcrum means intermediate of the upper surface of the top member and the truck frame whereby tilting movement of the equalizer and top member relative to the truck frame is permitted.

3. A spring assembly comprising an equalizing bar composed of two spaced apart side walls united by a transverse wall between the upper and lower edges of the side walls whereby a spring receiving chamber is provided above said transverse wall and a tie-rod receiving chamber is provided beneath said transverse wall, the spring receiving chamber being provided with a plurality of circular spring receiving pockets, the transverse wall beyond the ends of the spring receiving chamber being extended upwardly, the ends of the bar being disposed upwardly and thence outwardly into journal box engaging ends; a plurality of coil springs seated in said pockets and normally extending above the side walls of the chamber portion of the bar; and an elongated top member of channel formation in cross-section, provided with a plurality of circular spring receiving pockets adapted to receive the upper ends of said springs, the ends of said top member being reduced and adapted to enter between the side walls of the equalizer bar and between the upwardly extended transverse wall portions of the bar to prevent longitudinal and transverse movement of the top member, the top member intermediate of its ends being provided with a load carrying fulcrum point.

4. A spring assembly of the class described comprising a single piece equalizer having spaced apart side walls which curve upwardly and laterally at the ends of the equalizer, and a transverse wall beneath the upper edges of the side walls to provide a spring receiving chamber intermediate of the upwardly curved portions, said transverse wall extending upwardly between the upwardly curved side walls and terminating in vertical ends beyond the ends of said chamber; springs arranged in said chamber; a channeled top member adapted to receive and rest on the upper ends of said springs and provided with reduced ends adapted to extend between the vertical ends of the transverse wall and the upwardly curved portions of the side walls of the equalizer, the top member being provided with a load carrying fulcrum point; and wear resisting elements intermediate of the vertical ends of said transverse wall and the reduced ends of the top member.

5. In a spring assembly of the class described, an equalizing member composed of integrally united spaced apart side walls and a transverse wall united with the side walls intermediate of the upper and lower edges of the side walls so as to provide a spring receiving channel above the transverse wall and a tie-rod receiving channel beneath the transverse wall, the ends of the member being disposed upwardly and laterally into load transmitting portions; a plurality of coil springs seated in the upper channel; and a top member extending across all of the springs and adapted to provide a fulcrum for the frame, the ends of the top member being adapted to co-operate with the side walls of the equalizing member to prevent longitudinal and transverse movement of the top member.

6. A spring assembly comprising, in combination with a truck frame and the journal boxes slidingly mounted therein; a single piece equalizer member having upwardly and laterally disposed ends adapted to bear downwardly on the journal-boxes, while the intermediate portion of the member is provided with a plurality of spring receiving pockets having drain openings; coil springs seated in said pockets; a top member provided with spring receiving pockets and normally adapted to rest on said springs, the top of said top member being adapted to have a tiltable bearing relation with the truck frame; means intermediate of the ends of the top member and said equalizer member whereby longitudinal and transverse movement of the top member relative to the equalizer member is prevented; vibration absorbing means located in the spring pockets of the top member; and arcuate bearing members intermediate of the ends of the equalizer member and the tops of the journal-boxes.

7. In a spring assembly of the class described, the combination of a truck side frame with journal boxes slidably mounted therein, the tops of the journal boxes being dished; a single piece equalizer composed of spaced apart side walls united by a transverse wall above the lower edges of the side walls, the transverse wall terminating short of the ends of the equalizer and disposed upwardly to provide a chamber, the ends of the side walls of the equalizer curving upwardly and laterally and spaced apart to receive the side frame of the truck therebetween and said side walls united at the distal ends in a horizontally disposed wall; bearing members having convexed lower faces adapted to seat in the dished tops of the journal boxes while the upper faces of said members are flat to receive the distal ends of the equalizer; the frame, the horizontal wall at the distal ends of the equalizer and said bearing members being provided with registering ducts whereby lubricant may be introduced onto the dished faces of the journal boxes; a plurality of springs seated in said chamber; and a top member seatable on said springs and adapted to provide a fulcrum point for the truck frame, the ends of the top member being formed to have interengaging relation with the walls of the equalizer to prevent lateral and longitudinal movement of said top member.

8. A spring assembly comprising, in combination with a truck frame and the journal-boxes slidingly mounted therein, an equalizing member provided with a channel intermediate of its ends having spring receiving pockets in the bottom, the equalizing member having upwardly and laterally disposed ends adapted to rest on top of the journal boxes, the ends of the equalizing member being provided with apertured tie portions disposed above the journal boxes; anti-friction means associated with said tie portions whereby tiltable bearing relation with the journal boxes is provided, said anti-friction means being apertured to register with the aperture in the tie portions for the introduction of lubricant therethrough; a plurality of coil springs seated in said pockets; a dished cover member having spring seats on its dished surface to receive the tops of said springs and formed on its upper surface to constitute a fulcrum bearing point for the truck frame; and means whereby lengthwise movement of the cover member in said channel and wear on the end walls of the channel are prevented.

GEORGE C. BATZ.
HOWARD H. LANNING.